United States Patent [19]

Crounse

[11] 4,153,598
[45] May 8, 1979

[54] MONOAZO AND DIAZO COLORANTS FROM AMINOALKYLANILINES AND BIS(AMINOALKYL)ANILINES

[75] Inventor: Nathan N. Crounse, Cincinnati, Ohio

[73] Assignee: Sterling Drug Inc., New York, N.Y.

[21] Appl. No.: 821,792

[22] Filed: Aug. 4, 1977

Related U.S. Application Data

[60] Division of Ser. No. 641,566, Dec. 17, 1975, abandoned, which is a continuation-in-part of Ser. No. 548,015, Feb. 7, 1975, abandoned.

[51] Int. Cl.² .................. C09B 29/10; C09B 29/38; C09B 33/10; C09B 33/16
[52] U.S. Cl. ......................... 260/185; 260/163; 260/176; 260/197; 260/208; 260/570.8 R; 260/570.9
[58] Field of Search ............... 260/174, 177, 185, 191

[56] References Cited

U.S. PATENT DOCUMENTS

| 1,159,375 | 11/1915 | Gunther | 260/185 |
| 2,128,255 | 8/1938 | Krzikalla et al. | 260/199 |
| 2,128,256 | 8/1938 | Kazikalla et al. | 260/185 X |

Primary Examiner—Charles F. Warren
Attorney, Agent, or Firm—Lynn T. Fletcher; B. Woodrow Wyatt

[57] ABSTRACT

Water-insoluble azo dyestuffs of the formula

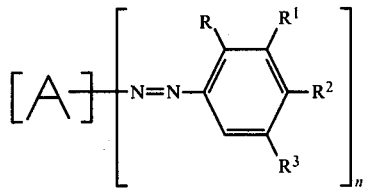

and water-soluble acid addition salts thereof useful for coloring natural fibers, synthetic fiber-forming material and cellulosic materials as well as in the manufacture of paper, varnishes, inks, coatings and plastics in which A represents an azoic coupling radical derived from a coupling component selected from the group consisting of arylides of hydroxysubstituted carbocyclic aromatic carboxylic acids, 1-aryl-5-hydroxypyrazoles, 6-amino-1-naphthol-3-sulfonic acid, and compounds having an enolizable ketomethylene group of the formula

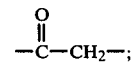

R is hydrogen, lower-alkyl, lower-alkoxy or halogen; $R^2$ is hydrogen, lower-alkyl, lower-alkoxy, halogen, aminomethyl or 2-aminoethyl with the proviso that A is other than β-naphthol when $R^2$ is aminomethyl or 2-aminoethyl; $R^1$ and $R^3$ are the same or different and are each hydrogen, lower-alkyl, lower-alkoxy, halogen or aminomethyl with the proviso that at least one of $R^1$ and $R^3$ is aminomethyl when $R^2$ is other than aminomethyl or 2-aminoethyl; and n represents an integer whose value is 1 or 2 and corresponds to the number of azo linkages, which dyestuffs are obtained by coupling a diazotized amine of the formula

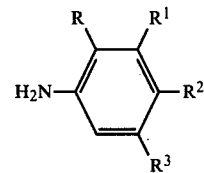

in which R, $R^1$, $R^2$ and $R^3$ are as defined above with said coupling component.

4 Claims, No Drawings

MONOAZO AND DIAZO COLORANTS FROM AMINOALKYLANILINES AND BIS(AMINOALKYL)ANILINES

This application is a division of my now abandoned application Ser. No. 641,566, filed on Dec. 17, 1975, which in turn is a continuation-in-part of my now abandoned application Ser. No. 548,015, filed Feb. 7, 1975.

BACKGROUND OF THE INVENTION (a) Field of the Invention

This invention relates to the field of chemistry and more particularly, to novel basic azo dyestuffs and to the acid addition salt forms thereof.

(b) Description of the Prior Art

Lacey U.S. Pat. No. 2,761,868 (patented Sept. 4, 1956) discloses green and blue basic dyestuffs of the phthalocyanine series bearing from one to eight aminomethyl groups.

German Pat. No. 82,626 (granted July 1, 1895) discloses basic azo dyestuffs obtained by diazotization of p-aminobenzylamine and coupling of the diazonium compound with beta-naphthol and resorcinol.

SUMMARY OF THE INVENTION

In its composition of matter aspect, the invention relates to certain water-insoluble azo dyestuffs of the formula

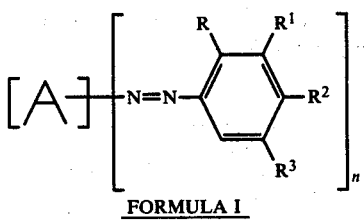

FORMULA I useful for coloring natural fibers, synthetic fiber-forming material and cellulosic materials as well as in the manufacture of paper, varnishes, inks, coatings and plastics and to the acid addition salt forms of the dyestuff.

In its process aspect, the invention relates to a process for preparing the water-insoluble azo dyestuffs of Formula I which comprises diazotizing an appropriate 2-R-3-$R^1$-4-$R^2$-5-$R^3$-aniline and coupling the resulting diazonium salt with a coupling component from which the azoic coupling radical represented by A in Formula I is derived.

DETAILED DESCRIPTION INCLUSIVE OF THE PREFERRED EMBODIMENTS

More specifically, this invention, in its composition of matter aspect, resides in the novel water-insoluble azo dyestuffs and in the water-soluble acid-addition salt forms thereof, of the formula

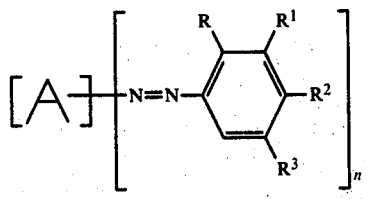

-continued
FORMULA I wherein: n is an integer whose value is one or two; R is hydrogen, lower-alkyl, lower-alkoxy or halogen; $R^2$ is hydrogen, lower-alkyl, lower-alkoxy, halogen, aminomethyl or 2-aminoethyl with the proviso that A is other than β-naphthol when $R^2$ is aminomethyl or 2-aminoethyl; $R^1$ and $R^3$ are the same or different and are each hydrogen, lower-alkyl, lower-alkoxy, halogen or aminomethyl with the proviso that at least one of $R^1$ and $R^3$ is aminomethyl when $R^2$ is other than aminomethyl or 2-aminoethyl; A is an azoic coupling radical which when n is one is selected from the class having the formulas

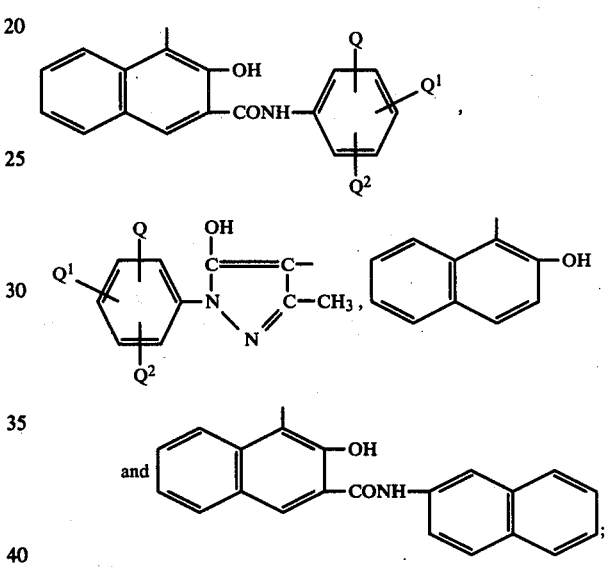

and, when n is two, is selected from the class having the formulas

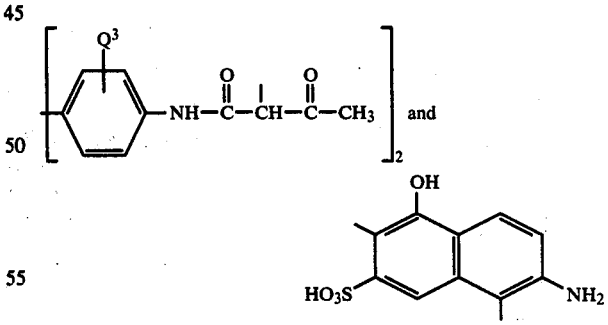

in which Q, $Q^1$ and $Q^2$ are the same or different and are each hydrogen, lower-alkyl, lower-alkoxy, nitro or halogen; and $Q^3$ is hydrogen, lower-alkyl, lower-alkoxy or halogen.

In the first particular embodiment in accordance with its composition of matter aspect, the invention sought to be patented resides in the novel monoazo chemical compounds of Formula I wherein n is one and A is an azoic coupling radical having the formula

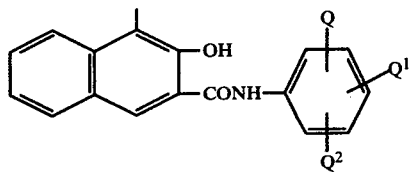

in which Q, $Q^1$ and $Q^2$ each have the same respective meanings indicated in relation to Formula I. Preferred compounds within the ambit of this particular embodiment are of the formula

FORMULA II

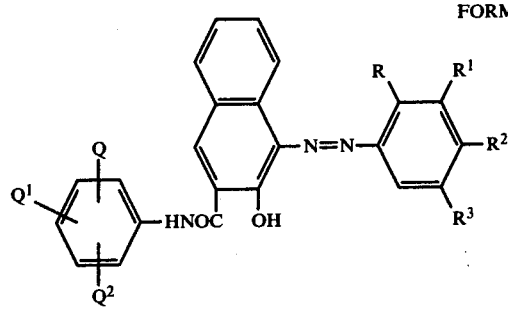

wherein Q, $Q^1$, $Q^2$, R, $R^1$, $R^2$ and $R^3$ each have the same respective meanings given in relation to Formula I.

In a second particular embodiment in accordance with its composition of matter aspect, the invention sought to be patented resides in the novel monoazo chemical compounds having the formula

FORMULA III

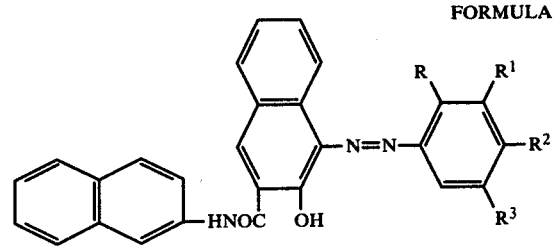

in which R, $R^1$, $R^2$ and $R^3$ each have the same respective meanings given in relation to Formula I.

In a third particular embodiment in accordance with its composition of matter aspect, the invention sought to be patented resides in the novel monoazo chemical compounds of the formula

FORMULA IV

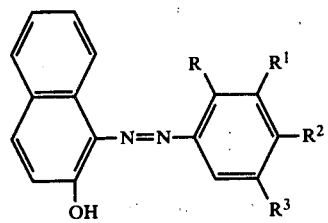

in which R, $R^1$, $R^2$ and $R^3$ each have the same respective meanings given in relation to Formula I.

In a fourth particular embodiment in accordance with its composition of matter aspect, the invention sought to be patented resides in the novel monoazo chemical compounds having the formula

FORMULA V

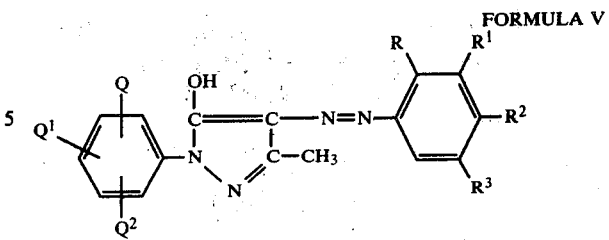

in which Q, $Q^1$, $Q_2$, R, $R^1$, $R^2$ and $R^3$ each have the same respective meanings given in relation to Formula I.

In a fifth particular embodiment in accordance with its composition of matter aspect, the invention sought to be patented resides in the novel disazo chemical compounds of the formula

FORMULA VI

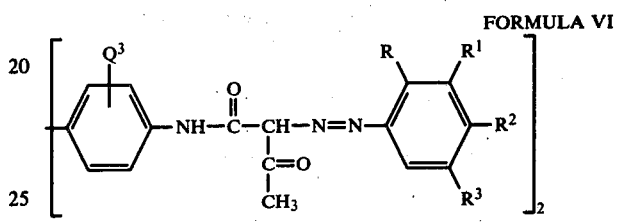

in which $Q^3$, R, $R^1$, $R^2$ and $R^3$ each have the same respective meanings given above in relation to Formula I.

In a sixth particular embodiment in accordance with its composition of matter aspect, the invention sought to be patented resides in the novel disazo chemical compounds having the formula

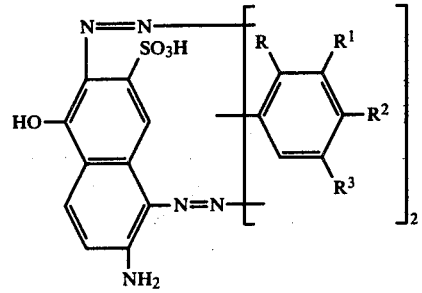

FORMULA VII in which R, $R^1$, $R^2$ and $R^3$ each have the same respective meanings given in Formula I.

In its process aspect, the invention sought to be patented resides in the process which comprises diazotizing an amine of the formula

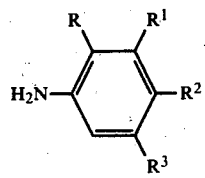

and coupling approximately n molecular proportions of the diazonium salt with one molecular proportion of a coupling component from which the azoic coupling radical A is derived to yield an azo dyestuff having the structure shown in Formula I and in which A, n, R, $R^1$, $R^2$ and $R^3$ have the same significance as in Formula I.

A particular embodiment in accordance with the process aspect of the invention resides in the process which comprises diazotizing an amine of the formula

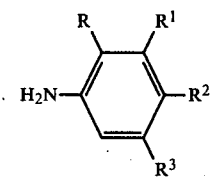

and coupling approximately one molecular proportion of the coupling component of the formula

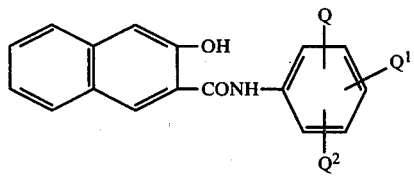

to yield an azo dyestuff having the structure shown in Formula II and in which Q, $Q^1$, $Q^2$, R, $R^1$, $R^2$ and $R^3$ have the same respective meanings indicated in relation to Formula II.

Another particular embodiment in accordance with the process aspect of the invention resides in the process which comprises diazotizing an amine of the formula

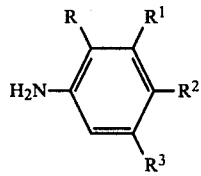

and coupling approximately two molecular proportions of the diazonium salt with one molecular proportion of the coupling component of the formula

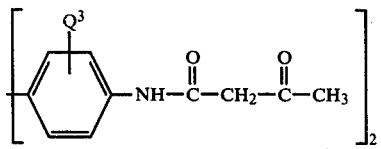

to yield an azo dyestuff having the structure shown in Formula VI and in which $Q^3$, R, $R^1$, $R^2$ and $R^3$ have the same respective meanings indicated in relation to Formula VI.

As used throughout, the term "halogen" includes bromine, chlorine, fluorine and iodine.

As used herein, the term "lower-alkyl" is a saturated straight- or branched-chain aliphatic radical of from one to three carbon atoms represented, for example, by methyl, ethyl, propyl and isopropyl.

Similarly, the term "lower-alkoxy" includes straight- or branched-chain aliphatic groups attached to the oxygen atom. Included, for example, in this term are methoxy, ethoxy, propoxy and isopropoxy.

The new dyestuffs of this invention are the water-insoluble basic azo compounds obtained by coupling the appropriate diazotized mono aminomethylated-, mono-aminoethylated- or bis(aminomethylated)-aniline with the appropriate coupling component, and the water-soluble acid-addition salt forms of said basic azo compounds.

The azoic coupling radicals represented by A are derived from coupling components which are generally known in the dyestuff art. The coupling components used herein are essentially of two types. One type is comprised of carbocyclic or heterocyclic aromatic compounds bearing a hydroxyl group which compounds are capable of coupling in a position vicinal to said hydroxyl group, for example, the arylamides of 2-hydroxy-3-naphthoic acid and 1-aryl-3-methyl-5-hydroxypyrazoles.

The second type of coupling component useful in this invention comprises compounds containing in an open carbon chain an enolizable ketomethylene group of the formula

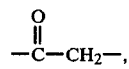

for example, the arylamides of acetoacetic acid. Many of the coupling components useful in this invention are designated in the prior art by a Naphtol AS designation. Where applicable, this designation will be used together with the chemical name.

The novel basic azo dyestuffs of the invention provide shades ranging from yellow through orange and red to blue-scarlet which in the free-base form have valuable properties as water-insoluble pigments, and in the acid-addition salt form as water-soluble direct dyes, useful in the dyeing art for coloring natural fibers, synthetic fiber-forming materials and cellulosic materials such as threads, sheets, fibers, filaments, textile fabrics and the like, as well as in the manufacture of paper, vanishes, inks, coatings and plastics.

The water-insoluble pigments and the water-soluble acid-addition salts thereof of this invention are characterized by good light-fastness. The pigments in the form of their water-soluble acid-addition salt form are useful as dyes for dyeing operations, and in the water-insoluble free-base form as pigments for printing operations on woven and non-woven substrates made from natural fibers, such as wool, cellulose or linen, those made from semi-synthetic fibers, such as regenerated cellulose as represented by rayon or viscose, or those made from synthetic fibers, such as polyaddition, polycondensation or polymerization compounds. Such dyeings or printings can be carried out in accordance with the usual dyeing and printing processes. The water-insoluble pigments can also be added to spinning solutions prior to polycondensation or polymerization.

The water-insoluble basic azo pigments of this invention are also suitable for surface coloring or printing paper and cardboard as well as for coloring paper pulps. Moreover, they are useful for incorporation into lacquers and films of various constitution, for example, those made from cellulose acetate, cellulose propionate, polyvinyl chloride, polyethylene, polypropylene, polyamides, polyesters of alkyd resins. In addition the subject compounds are suitable for coloring natural or synthetic resins, for example, acrylic resins, epoxy resins, polyester resins, vinyl resins, polystyrene resins, or alkyd resins.

The basic azo dyestuffs of this invention are readily converted to water-soluble dyes by treatment with an aqueous solution containing a stoichiometric amount of an inorganic mineral acid selected from the group consisting of hydrochloric, nitric and phosphoric acids or with an organic acid selected from the group consisting of acetic, glycolic, formic, lactic and methanesulfonic acids. The acid-addition salt forms can be isolated from the aqueous solution in which they are formed by techniques well known in the art, for example, by salting out, precipitation or concentration by evaporation. However, the water-soluble dyes thus formed are readily utilized in the form of aqueous solutions for many of their applications, particularly for dyeing cellulose. Accordingly, it is particularly preferred to retain the dyes in a concentrated aqueous solution of the type regularly employed in the paper industry for dyeing paper products.

The water-soluble acid-addition salt form of the subject basic azo dyestuffs are especially valuable dyes for imparting various shades of a stable red, scarlet, orange or yellow color to cotton and to paper, both sized and unsized. For use in the paper trade, the dyes of this invention have several outstanding advantages. Their high degree of water-solubility makes them particularly suitable for the preparation of liquid dye concentrates which are preferred in the paper industry. The subject dyes are also less prone to "bleed" when paper impregnated therewith is wet and placed in contact with moist white paper. This is a particularly desirable property for dyes designed for coloring paper to be used in facial tissues, napkins and the like wherein it can be foreseen that the colored paper, wetted with common household liquids such as water, soap solutions, milk, carbonated beverages, and so forth, may come in contact with other surfaces, such as textiles, paper and the like which should be protected from stain. Another advantageous property of these new water-soluble dyes for use in the paper trade is found in their high degree of color discharge when bleached with hypochlorite or "chlorine" bleach. This property of dyes is particularly desired by papermakers in order that dyed paper may be completely bleached prior to reprocessing. Still another advantageous property of the water-soluble dyestuffs of this invention is found in their high resistance to a change of shade when used to color cellulosic materials, which have either previously been treated with or are treated subsequent to dyeings, with wet-strength resin.

We have also found that the dyes of this invention have a high degree of substantivity for bleached fiber such as is used in most colored disposable paper products. Moreover, they are absorbed by cellulosic fibers from aqueous solution at a very rapid rate. These properties are advantageous to the paper industry, because it allows the dye to be added to the pulp just prior to formation of the sheet.

The best mode contemplated by the inventor of carrying out this invention will now be described as to enable any person skilled in the art to which it pertains to make and use the same.

The novel dyestuffs of the invention are prepared by generally known methods, for example, by coupling the appropriate diazotized mono-, bis(aminomethyl)- or mono (2-aminoethyl)substituted aniline with the appropriate coupling component in an aqueous medium. In preparation of the compounds of Formula I, the ratio of the quantity of diazonium compound to coupling component is, of course, dependent on the number of coupling sites available in the coupling component. Thus when a single coupling site is present, for example, in a 2-hydroxy-3-naphthanilide, there is employed approximately one molecular proportion of the diazonium compound and when two coupling sites are available as, for example, in 4,4'-bi-acetoacet-o-toluidide (Naphtol AS-G) there are employed approximately two molecular proportions of the diazonium compound. Since the reaction temperature has some effect on the shade of the resulting water-insoluble azo dyestuffs, it is ordinarily desirable to maintain adequate control of the temperature of the reaction mixture in some predetermined manner. It is generally satisfactory to stir the reactants together at a temperature in the approximate range 0°–15° C. to effect only an incomplete coupling reaction, and then to warm the mixture to a higher temperature, for instance in the approximate range 25°–50° C., preferably at 30°–35° C., to complete the coupling reaction and develop the dyestuff. The reaction is begun in an alkaline aqueous medium but the pH of the reaction mixture drops during the process to a final value of about 5.0. After completion of the coupling reaction, the water-insoluble basic azo dyestuffs can be isolated from the coupling mixture by filtration. The compounds thus obtained are readily converted to water-soluble dyestuffs by treatment in an aqueous medium with at least a stoichiometric quantity of an appropriate inorganic or organic acid as mentioned hereinbefore and the resultant dye can optionally be isolated or the aqueous solution in which it is formed can be adjusted to the desired concentration and used directly for dyeing operations.

The following compounds exemplify some of the azoic coupling components useful for preparing the pigments of the invention.

3-Hydroxy-2-naphthanilide (Naphtol AS),
3-Hydroxy-2',5'-dimethoxy-2-naphthanilide (Naphtol AS-BG),
3-Hydroxy-3'-nitro-2-naphthanilide (Naphtol AS-BS),
3-Hydroxy-2-naphtho-ortho-toluidide (Naphtol AS-D),
5'-Chloro-3-hydroxy-2',4'-dimethoxy-2-naphthanilide (Naphtol AS-ITR),
4'-Chloro-3-hydroxy-2',5'-dimethoxy-2-naphthanilide (Naphtol AS-LC),
3-Hydroxy-2'-methyl-2-naphth-para-anisidide (Naphtol AS-LT),
3-Hydroxy-2-naphtho-2,4-xylidide (Naphtol AS-MX),
3-Hydroxy-2-naphth-ortho-anisidide (Naphtol AS-OL),
3-Hydroxy-2-naphtho-ortho-phenetidide (Naphtol AS-PH),
3-Hydroxy-2-naphth-para-anisidide (Naphtol AS-RL),
3-Hydroxy-N-2-naphthyl-2-naphthamide (Naphtol AS-SW),
4'-Chloro-3-hydroxy-2-naphtho-ortho-toluidide (Naphtol AS-TR),
3'-Chloro-3-hydroxy-2-naphtho-ortho-toluidide (Naphtol AS-KB),
7-Bromo-3-hydroxy-2-naphth-ortho-anisidide,
3'-Chloro-3-hydroxy-2-naphth-ortho-anisidide (Naphtol AS-NEL),
3-Methyl-1-(p-tolyl)-5-hydroxypyrazole,
3-Methyl-1-(3-bromophenyl)-5-hydroxypyrazole,
3-Methyl-1-(4-iodophenyl)-5-hydroxypyrazole,
3-Methyl-1-(o-tolyl)-5-hydroxypyrazole,
3-Methyl-1-(4-chlorophenyl)-5-hydroxypyrazole,
3-Methyl-1-(2-ethoxy-5-nitrophenyl)-5-hydroxypyrazole, 3-Methyl-1-(2,4-dichlorophenyl)-5-hydroxypyrazole,
3-Methyl-1-(2,4-dinitrophenyl)-5-hydroxypyrazole,
3-Methyl-1-(2-methyl-4-iodophenyl)-5-hydroxypyrazole,
3-Methyl-1-(2,5-dimethylphenyl)-5-hydroxypyrazole,
3-Methyl-1-(2,4,6-trichlorophenyl)-5-hydroxypyrazole,
3-Methyl-1-phenyl-5-hydroxypyrazole,
3-Methyl-1-(4-methoxyphenyl)-5-hydroxypyrazole,
3-Methyl-1-(4-ethoxyphenyl)-5-hydroxypyrazole,
3-Methyl-1-(4-propoxyphenyl)-5-hydroxypyrazole,
3-Methyl-1-(3-nitrophenyl)-5-hydroxypyrazole,
3-Methyl-1-(4-nitrophenyl)-5-hydroxypyrazole,
3-Methyl-1-(2-chlorophenyl)-5-hydroxypyrazole,
4',4'''-Biacetoacetanilide,
4,4'-Bi-ortho-acetoacetotoluidide (Naphtol AS-G),
2',2'''-Diiodo-4',4'''-biacetoacetanilide,
2',2'''-Dibromo-4',4'''-biacetoacetanilide,
2',2'''-Dichloro-4',4'''-biacetoacetanilide,
3',3'''-Diethoxy-4',4'''-biacetoacetanilide, It will be obvious that those aryl moieties of the azoic coupling radicals represented by A in Formula I which are not shown bearing substituents represented by Q, $Q^1$ and $Q^2$ can also be substituted by groups, represented by Q, $Q^1$ and $Q^2$, for example, lower-alkyl, lower-alkoxy and halogen.

The requisite diazotizable amines, which are anilines bearing one or two aminomethyl groups or one 2-aminoethyl group on the ring are known classes of compounds which are either commercially available or can be readily obtained by procedures well known in the prior art. For example, an appropriate aniline is interacted with approximately one molecular equivalent each of formaldehyde and phthalimide to obtain the corresponding phthalimidomethyl aniline which is then subjected to hydrolysis to obtain the desired mono-aminomethyl-substituted intermediate. The bis-aminomethylated intermediates are similarly obtained by the interaction of an appropriate aniline with approximately two molecular equivalents each of formaldehyde and phthalimide to obtain the corresponding bis(phthalimidomethyl)aniline which is then hydrolyzed to obtain the desired bis(aminomethyl)aniline. The following compounds are exemplary of ring aminomethylated anilines useful in the practice of this invention.

3-Aminomethylaniline,
4-Methyl-3-aminomethylaniline,
2-Methoxy-3-aminomethylaniline,
4-Methoxy-3-aminomethylaniline,
2-Methyl-5-aminomethylaniline,
2,3-Dimethyl-5-aminomethylaniline,
2-Isopropyl-5-methyl-3-aminomethylaniline,
3-Isopropyl-2-methoxy-5-aminomethylaniline,
4,5-Dimethoxy-2-propyl-3-aminomethylaniline,
3-Bromo-5-aminomethylaniline,
5-Isopropyl-2-methyl-3-aminomethylaniline,
5-Ethyl-2-methyl-3-aminomethylaniline,
3,4-Diethyl-5-aminomethylaniline,
3-Methoxy-4-methyl-5-aminomethylaniline,
3-Chloro-4-isopropyl-5-aminomethylaniline,
2,3,4-Trimethyl-5-aminomethylaniline,
2-Chloro-4,5-dimethoxy-3-aminomethylaniline,
5-Chloro-2,4-diethoxy-3-aminomethylaniline,
4,5-Dimethoxy-2-fluoro-3-aminomethylaniline,
2-Chloro-4-methoxy-5-methyl-3-aminomethylaniline,
2,5-Dichloro-4-methoxy-3-aminomethylaniline,
4-(2-Aminoethyl)aniline,
2-Methoxy-4-aminomethylaniline,
4-Aminomethylaniline,
2-Chloro-4-aminomethylaniline,
2-Ethoxy-4-aminomethylaniline,
5-Chloro-2-propyl-3-aminomethylaniline,
3,5-Bis(aminomethyl)aniline,
4-Methyl-3,5-bis(aminomethyl)aniline,
4-Methoxy-3,5-bis(aminomethyl)aniline,
2-Methoxy-3,5-bis(aminomethyl)aniline,
2,4-Diethyl-3,5-bis(aminomethyl)aniline,
2-Iodo-3,5-bis(aminomethyl)aniline,
4-Fluoro-3,5-bis(aminomethyl)aniline,
2-Methoxy-4-methyl-3,5-bis(aminomethyl)aniline,
2,4-Diisopropyl-3,5-bis(aminomethyl)aniline, and
4-Bromo-2-methoxy-3,5-bis(aminomethyl)aniline.
2-Bromo-4-aminomethylaniline.

The manner in which the new pigments and dyes of this invention are obtained and used is illustrated by the following examples without, however, being limited thereto. In the following examples, the term "parts" is in each instance used to indicate parts by weight and the relationship of parts by weight to parts by volume is the same as that of the kilogram to the liter.

EXAMPLE 1

To a solution of 15.4 parts of 4-methoxy-3,5-bis-(aminomethyl)aniline trihydrochloride in 250 parts of water and 6 parts of concentrated hydrochloric acid were added 200 parts of crushed ice. The amine was then diazotized at a temperature between 0°–5° C. by adding a solution of 4.2 parts of sodium nitrite in 30 parts of water. The reaction mixture was stirred at less than 5° C. for 30 minutes after which the excess nitrate was removed by the gradual addition of sulfamic acid until nitrite ion could no longer be detected by testing with starch-iodide paper. The cold solution was then made slightly alkaline to Congo Red paper by the addition of sodium acetate.

In a separate container, 14.7 parts of 3-hydroxy-2-naphth-o-anisidide (Naphtol AS-OL) were mixed with 46.5 parts of 2-ethoxyethanol, 94 parts of warm water, 8 parts of 50 percent aqueous solution of sodium hydroxide and 0.033 parts of nonylphenoxypoly(ethyleneoxy)ethanol (Igepal ® CO-630). The solution thus obtained was diluted with 310 parts of cold water and the cold diazonium solution obtained as described above was added in a thin stream to the diluted solution. The reaction mixture was stirred at 20°–25° C. until consumption of the diazonium salt was complete. Eleven parts of glacial acetic acid were added to the resulting red mixture, which was heated to 50° C. and filtered. The clear red filtrate was made slightly alkaline to Brilliant Yellow paper by the addition of sodium carbonate whereupon a tacky red solid precipitated. The solid was collected and washed with water and dried in a vacuum oven to obtain chiefly the red dyestuff having the formula

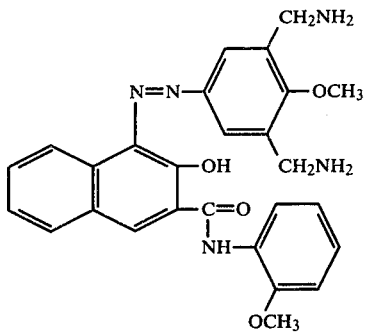

The visible absorption spectrum of an aqueous acetic acid solution of this dyestuff, containing 0.02 g of dye per liter of solution showed maxima at 503 millimicrons, $A=0.848$, and at 525 millimicrons, $A=0.820$.

A concentrated dye solution was prepared by adding 20 parts of this dyestuff to a mixture of 11.4 parts of 70 percent glycolic acid, 8 parts of 2-(ethoxyethoxy)ethanol and 34 parts of water at a temperature between 50° and 60° C. The mixture was stirred until solution was complete. Paper dyed with aqueous dilutions of this concentrate had a scarlet shade and was found to be highly bleachable, in the bleach test described below. The dye was also found to bleed only slightly in the water-bleed test and in the soap-bleed test when tested in accord with the procedure described below.

Testing Procedures

The following test procedures were employed to determine the resistance of the dyestuffs to bleed in moist paper, bleed from paper in the presence of soap, and to bleaching with hypochlorite bleach.

Water "Bleed" Test

This procedure is a modification of the AATCC Standard Test Method 15-1962, "Colorfastness to Perspiration".

Test pieces consisting of four plies, each one inch square, are cut from the dyed paper to be tested. One or more dyed papers of known dye migration quality are included in the test series as standards.

The absorbent material consists of filter paper having a relatively smooth finish (Whatman #1, 4.25 cm. dia. equivalent). In addition, smooth, flat, glass or clear plastic plates of adequate stiffness, measuring two inches wide and three inches long, are required as separating plates. A 1,000 gram weight serves as a dead weight loading.

Four filter paper absorbent pieces are used for each dyed paper test square, two for each side.

The migration test "sandwich" is constructed as follows. A separating plate is placed on a horizontal support and two pieces of the filter paper placed centrally on this plate with the smoother side up. The square dyed paper test pieces, held by tweezers, are immersed in tap water at room temperature for five seconds, drained for five seconds, and immediately centered on the filter paper. Immediately, two pieces of filter paper are centered on the test square and followed at once by another separating plate. This "sandwich" is pressed for a moment with the fingers, after which, without delay, a piece of filter paper is positioned on the top separating plate as before to receive a second test square of wetted dyed paper. The above procedure is then repeated as rapidly as possible and without interruption, stacking one "sandwich" on the other, until all dyed paper test pieces have been put under test.

As soon as a stack is completed, a 1,000 gram weight is centered on the top separating plate. The stack is allowed to stand at room temperature (75° F.) for fifteen minutes.

At the end of the migration period, the stack is disassembled, and each dyed paper test square and its filter paper absorbents clipped to a supporting card. A separate card is used for each test square. The dyed paper test squares and filter papers are air dried at room temperature for at least two hours (in the dark) before ranking. Relative degrees of dye migration, as compared to that from standard samples, are determined by visual ratings, in daylight, of the intensity of dye stain on the filter paper surfaces which had been in contact with the test square.

Soap Bleed Test

This procedure utilizes the same method employed in the Water Bleed Test described above, except that the dyed paper test squares are immersed in a 0.5 percent tap water solution of white soap flakes (a mixture of 80 percent sodium soap and 20 percent potassium soap produced from 70 percent tallow and 30 percent coconut oil glyceride blend; "Ivory" brand, Procter and Gamble Co.) at 120° F., instead of water alone.

Bleach Test

This procedure compares the degree to which the color of dyed papers would be discharged in a waste paper recovery operation employing hypochlorite bleach.

A preliminary estimate of bleachability is obtained by placing a drop of hypochlorite bleach, containing 2.5 percent available chlorine; on the dyed paper and allowing it to dry at room temperature. From this test, both rate and degree of bleaching are estimated.

A more accurate test, approximating paper mill procedure, is performed by defibering three grams of dyed paper in 150 ml of distilled water using a kitchen blender. The defibered pulp slurry is placed in a jar and hypochlorite is added to the extent desired, usually 2.5 percent available chlorine based on the weight of the dry fiber. The slurry consisting of pulp and hypochlorite is adjusted to pH 9 with dilute sulfuric acid or dilute aqueous solution of sodium hydroxide and placed in a water bath to maintain the interval in the temperature range of 115° F. to 125° F. After the test is started, the jar is loosely capped. At five minute intervals, the cap is tightened and the jar inverted twice to circulate the liquor. The cap is loosened between inversions. After twenty minutes, the pH is checked and, if higher than 7.5, is adjusted thereto. The test is then continued for an additional twenty minutes (with five minutes between inversions). The terminal pH is generally found to be 6.0–6.5. An excess of sodium thiosulfate is added as an antichlor, mixed for five minutes and the slurry is diluted to a concentration of approximately 0.3 percent of fiber. Sheets are then prepared at pH 7 without a washing step. Finally, this sheet is pressed and dried in a paper dryer. Control dyeings at specific levels can then be made to accurately determine the loss of strength of color on bleaching.

EXAMPLE 2

Following the procedure described in Example 1 above, 7.58 parts of 2-methoxy-5-aminomethylaniline in a solution of 137 parts of water and 12 parts of concentrated hydrochloric acid were diazotized with 3.5 parts of sodium nitrite at 0° C. In a separate container 9.2 parts of 4,4'-bi-acetoacet-o-toluidide (Naphtol AS-G) were mixed with 15.7 parts of isopropanol, 95 parts of water and 5.3 parts of 50 percent aqueous solution of sodium hydroxide. A solution resulted which was then added in a thin stream to the cold diazonium solution. The reaction mixture was stirred at room temperature until there was no diazonium salt remaining. The solid product, which resulted, was collected by filtration and dried in a vacuum oven. There was thus obtained a yellow dyestuff having the formula

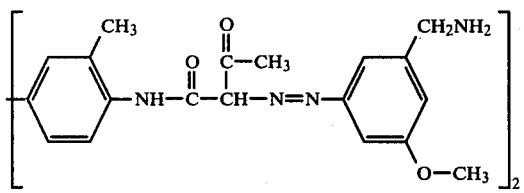

The visible absorption spectrum of an aqueous acetic acid solution of this dyestuff, containing 0.02 g of the dye per liter of solution showed a maximum at 402 millimicrons, A=0.99.

A dye solution was prepared by thoroughly mixing one part of this dyestuff with one part of acetic acid and diluting the resultant paste of the acetic acid addition salt to a volume of one liter with water. Paper dyed with this solution had a yellow shade and was found to be highly bleachable and showed no bleed in the water-bleed test and in the soap-bleed test.

EXAMPLE 3

Following the procedure described in Example 1 above, 15.4 parts of 2-methoxy-3,5-bis(aminomethyl)aniline trihydrochloride in a solution of 250 parts water and 6 parts of concentrated hydrochloric acid were diazotized with 3.5 parts of sodium nitrite at 0° C. In a separate container, 5.8 parts of 6-amino-1-naphthol-3-sulfonic acid were dissolved in a solution of 100 parts of water and 7.9 parts of 50 percent aqueous solution of sodium hydroxide. The solution was added in a thin stream to the cold diazonium solution. The reaction mixture was allowed to warm to 30° C. and stirring was continued until there was no diazonium salt remaining. The resulting dark solution was made slightly alkaline to Brilliant Yellow paper and 100 parts of sodium chloride were added to precipitate the product. The separated solid was collected by filtration and dried in a vacuum oven to obtain chiefly a brown dyestuff having the formula

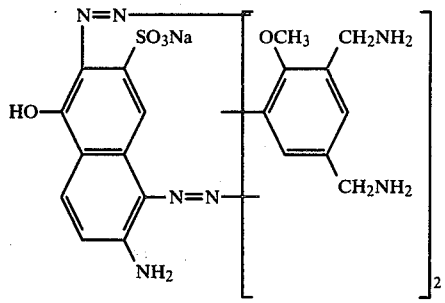

The visible absorption spectrum of an aqueous acetic acid solution of this dyestuff, containing 0.02 g of the dye per liter of solution showed a maximum at 475 millimicrons, A=0.72.

A dye solution was prepared by thoroughly mixing one part of this dyestuff with two parts of ten percent aqueous acetic acid and diluting the mixture to a volume of one liter with water. Paper dyed with this solution had a brown shade and was found to be highly bleachable. The dye was found to bleed only slightly in the water-bleed test and in the soap-bleed test.

EXAMPLE 4

Following the procedure described in Example 1 above, 15.4 parts of 2-methoxy-3,5-bis(aminomethyl)aniline trihydrochloride in a solution of 250 parts of water and 6 parts of concentrated hydrochloric acid were diazotized with 3.5 parts of sodium nitrite at 0° C. In a separate container, nine parts of 4,4'-bi-acetoacet-o-toluidide (Naphthol AS-G) were mixed with 15 parts of isopropanol, 90 parts of water and 5.3 parts of 50 percent aqueous solution of sodium hydroxide. A solution resulted which was then added in a thin stream to the cold diazonium solution. The reaction mixture was stirred at a temperature in the range of 10°-15° C. for one hour and was then warmed to 30° C. Stirring at 30° C. was continued until the consumption of the diazonium salt was complete. The slurry was made slightly alkaline to Brilliant Yellow paper and the yellow product was collected by filtration, washed with water and dried in a vacuum oven to obtain chiefly a yellow dyestuff having the formula

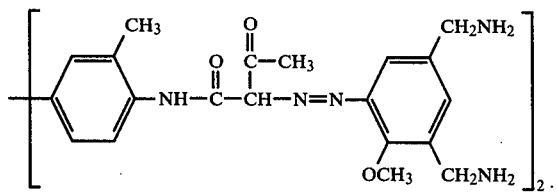

The visible absorption spectrum of an aqueous acetic acid solution of this dyestuff, containing 0.02 g of the dye per liter of solution showed a maximum at 387 millimicrons, A=1.324.

A concentrated dye dispersion was prepared by adding 18.5 parts of this dyestuff to a mixture of 20 parts of acetic acid and 74 parts of water at 60° C. The mixture was heated at 90° C. for one hour then cooled. Paper dyed with aqueous dilutions of this dye dispersion had a greenish yellow shade and was found to be highly bleachable. The dye was found to have no bleed in the water-bleed test and in the soap-bleed test.

EXAMPLE 5

Following the procedure described in Example 1 above, 15.4 parts of 4-methoxy-3,5-bis(aminomethyl)aniline trihydrochloride in a solution of 250 parts water and 6 parts of concentrated hydrochloric acid were diazotized with 4.2 parts of sodium nitrite at 0° C. In a separate container, nine parts of 4,4′-bi-acetoacet-o-toluidide (Naphtol AS-G) were mixed with 15 parts of methanol, 90 parts of water and 5.3 parts of 50 percent aqueous solution of sodium hydroxide. A solution resulted which was then added in a thin stream to the cold diazonium solution obtained as described above. The reaction mixture was stirred between 10° and 15° C. for one hour and then was warmed to 30° C. Stirring at 30° C. was continued until consumption of the diazonium salt was complete. The slurry which resulted was made slightly alkaline to Brilliant Yellow paper by the addition of sodium carbonate and the product was collected by filtration and washed with water. The product was dried in a vacuum oven to obtain chiefly a yellow dyestuff having the formula

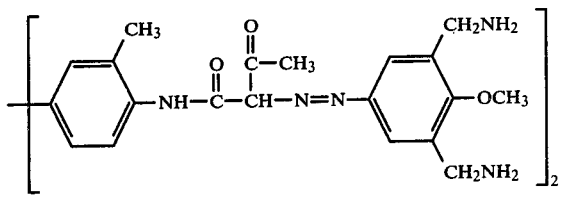

The visible absorption spectrum of an aqueous acetic acid solution of this dyestuff containing 0.02 g of the dye per liter of solution showed a maximum at 384 millimicrons, $A = 1.394$.

A concentrated dye solution was prepared by adding seven parts of this dyestuff to a mixture of 3.5 parts of acetic acid and 24 parts of water at a temperature between 70° and 80° C. The mixture was stirred until the solution was complete. Paper dyed with aqueous dilutions of this dye concentrate had a greenish yellow shade and was found to be highly bleachable. The dye was found to bleed only slightly in the water-bleed and in the soap-bleed test.

A concentrated dye solution was also prepared by mixing 115 parts of a dyestuff paste containing approximately 7 parts of this dyestuff and 108 parts of water with 10.2 parts of a 70 percent aqueous methanesulfonic acid solution and 60 parts of water. The resulting mixture was heated to approximately 60° C., cooled to ambient temperature and the insolubles removed by filtration. The filtrate showed a maximum in the visible absorption spectrum at 385 millimicrons.

The following table lists further Examples of additional azo dyestuffs of this invention prepared by diazotizing the amines shown in the second column of the table and coupling the resulting diazo compounds with the coupling components shown in the third column of the table following procedures similar to those described in Examples 1–5 above. The indicated shades are obtained when aqueous solutions of the acid-addition salt forms of the dyestuffs are used for dyeing cellulose.

| Example No. | Diazotized Amine | Coupling Component | Shade |
|---|---|---|---|
| 6 | 4-methyl-3-amino-Methylaniline | 4,4′-bi-ortho-aceto-acetotoluidide (Naphtol AS-G) | Greenish-Yellow |
| 7 | " | 5′-chloro-3-hydroxy-2′,4′-dimethoxy-2-naphthanilide (Naphtol AS-ITR) | Red |
| 8 | " | 3-methyl-1-(p-tolyl)-5-hydroxypyrozole | Reddish-Yellow |
| 9 | " | 3′-chloro-3-hydroxy-2-naphth-ortho-anisidide (Naphtol AS-NEL) | red |
| 10 | " | 4′,4‴-biacetoacet-anilide | Yellow |
| 11 | 4-methoxy-3-aminomethlyaniline | 3-hydroxy-2-naphtho-ortho-anisidide (Naphtol AS-OL) | Red |
| 12 | " | 2′,2‴-dichloro-4′,4‴-biacetoacet-anilide | Greenish-Yellow |
| 13 | " | 3-methyl-1-(p-tolyl)-5-hydroxypyrozole | Reddish-Yellow |
| 14 | " | 4′-chloro-3-hydroxy-2′,5′-dimethoxy-2-naphthanilide (Naphtol AS-LC) | Red |
| 15 | 4-methyl-3,5-bis-(aminomethyl)-aniline | 3-hydroxy-2-naphth-ortho-anisidide (Naphtol AS-OL) | Red |
| 16 | " | 2′,2‴-dichloro-4′,4‴-biacetacet-anilide | Greenish-Yellow |
| 17 | " | 3-methyl-1-(p-tolyl)-5-hydroxypyrozole | Reddish-Yellow |
| 18 | " | 4′-chloro-3-hydroxy-2′,5′-dimethoxy-2-naphthanilide (Naphtol AS-LC) | Scarlet |
| 19 | " | 4′,4‴-biacetoacet-anilide | Greenish-Yellow |

-continued

| Example No. | Diazotized Amine | Coupling Component | Shade |
|---|---|---|---|
| 20 | 4-methoxy-3,5-bis-(aminomethyl)aniline | 3-hydroxy-3'-nitro-2-naphthanilide (Naphtol AS-BS) | Red |
| 21 | " | 3-hydroxy-2-naphth-anilide (Naphtol AS) | Scarlet |
| 22 | " | 3-hydroxy-N-2-naphthyl-2-naphthamide (Naphtol AS-SW) | Scarlet |
| 23 | " | 3'-chloro-3-hydroxy-2-naphth-ortho-anisidide (Naphtol AS-NEL) | Scarlet |
| 24 | " | 5'-chloro-3-hydroxy-2',4'-dimethoxy-2-naphthanilide (Naphtol AS-ITR) | Bluish-Red |
| 25 | " | 3-methyl-1-phenyl-5-hydroxypyrozole | Reddish-Yellow |
| 26 | 2-methoxy-3,5-bis(aminomethyl)aniline | 3-hydroxy-2-naphth-anilide (Naphtol AS) | Scarlet |
| 27 | " | 3-hydroxy-2-naphth-ortho-anisidide (Naphtol AS-OL) | Scarlet |
| 28 | " | 3-hydroxy-2-naphth-para-anisidide (Naphtol AS-RL) | Scarlet |
| 29 | " | 3'-chloro-3-hydroxy-2-naphth-ortho-anisidide (Naphtol AS-NEL) | Scarlet |
| 30 | " | 3-hydroxy-3'-nitro-2-naphthanilide (Naphtol AS-BS) | Red |
| 31 | " | 2-naphtol | Orange |
| 32 | " | 3-methyl-1-(p-tolyl)-5-hydroxypyrazole | Yellow |
| 33 | 3-aminomethylaniline | 3-hydroxy-2-naphth-anilide (Naphtol AS) | Scarlet |
| 34 | " | 3'-chloro-3-hydroxy-2-naphth-ortho-anisidide (Naphtol AS-NEL) | Scarlet |
| 35 | " | 2',2'''-dibromo-4',4'''-biacetoacetanilide | Yellow |
| 36 | " | 4'-chloro-3-hydroxy-2-naphtho-ortho-toluidide (Naphtol AS-TR) | Red |
| 37 | " | 4',4'''-biacetoacet-anilide | Yellow |
| 38 | " | 3-methyl-1-(4-methoxyphenyl)-5-hydroxypyrazole | Reddish-Yellow |
| 39 | 2-methoxy-3-aminomethylaniline | 3'-chloro-3-hydroxy-2-naphth-ortho-anisidide (Naphtol AS-NEL) | Red |
| 40 | " | 3-hydroxy-2'-methyl-2-naphth-para-anisidide (Naphtol AS-LT) | Red |
| 41 | " | 3',3'''-diethoxy-4',4'''-biacetoacetanilide | Yellow |
| 42 | " | 7-bromo-3-hydroxy-2-naphth-ortho-anisidide | Red |
| 43 | " | 4',4'''-biacetoacet-anilide | Yellow |
| 44 | " | 3-methyl-1-(4-ethoxyphenyl)-5-hydroxypyrazole | Reddish-Yellow |
| 45 | 2-methyl-5-aminomethylaniline | 2',2'''-diiodo-4',4'''-biacetoacet-anilide | Yellow |
| 46 | " | 3'-chloro-3-hydroxy-2-naphth-ortho-anisidide (Naphtol AS-NEL) | Red |
| 47 | " | 3-hydroxy-2',5'-dimethoxy-2-naphth-anilide (Naphtol AS-BG) | Bluish- |
| 48 | " | 2',2'''-dichloro-4',4'''-biacetoacetani- | Greenish-Yellow |

-continued

| Example No. | Diazotized Amine | Coupling Component | Shade |
|---|---|---|---|
| 49 | " | lide 3-methyl-1-(4-propoxyphenyl)-5-hydroxy-pyrazole | Reddish-Yellow |
| 50 | 2,3-dimethyl-5-aminomethylaniline | 3'-chloro-3-hydroxy-2-naphtho-ortho-toluidide (Naphtol AS-KB) | Red |
| 51 | " | 3-hydroxy-3'-nitro-2-naphthanilide (Naphtol AS-BS) | Bluish-Red |
| 52 | " | 5'-chloro-3-hydroxy-2',4'-dimethoxy-2-naphthanilide (Naphtol AS-ITR) | Bluish-Red |
| 53 | " | 3'-chloro-3-hydroxy-2-naphth-ortho-anisidide (Naphtol AS-NEL) | Red |
| 54 | " | 4',4'''-biacetoacetanilide | Yellow |
| 55 | " | 3-methyl-1-(3-nitrophenyl)-5-hydroxy-pyrazole | Reddish-Yellow |
| 56 | 2-isopropyl-5-methyl-3-aminomethylaniline | 3-hydroxy-2-naphtho-ortho-toluidide (Naphtol AS-D) | Red |
| 57 | " | 4,4'-bi-ortho-aceto-acetotoluidide (Naphtol AS-G) | Yellow |
| 58 | " | 3',3'''-diethoxy-4',4'''-biacetoacetanilide | Reddish-Yellow |
| 59 | " | 3-methyl-1-(p-tolyl)-5-hydroxypyrazole | Reddish-Yellow |
| 60 | 3-isopropyl-2-methoxy-5-aminomethylaniline | 3-hydroxy-2-naphtho-2,4-xylidide (Naphtol AS-MX) | Red |
| 61 | " | 2',2'''-dichloro-4',4'''-biacetoacetanilide | Yellow |
| 62 | " | 5'-chloro-3-hydroxy-2',4'-dimethoxy-2-naphthanilide (Naphtol AS-ITR) | Bluish-Red |
| 63 | " | 7-bromo-3-hydroxy-2-naphth-ortho-anisidide | Red |
| 64 | " | 3-methyl-1-(4-nitrophenyl)-5-hydroxy-pyrazole | Reddish-Yellow |
| 65 | 4,5-dimethoxy-2-propyl-3-aminomethylaniline | 3-hydroxy-2-naphtho-ortho-phenetidide (Naphtol AS-PH) | Red |
| 66 | " | 2',2'''-dibromo-4',4'''-biacetoacetanilide | Yellow |
| 67 | " | 3-hydroxy-N-2-naphthyl-2-naphthamide (Naphtol AS-SW) | Bluish-Red |
| 68 | " | 4'-chloro-3-hydroxy-2-naphtho-ortho-toluidide (Naphtol AS-TR) | Red |
| 69 | " | 4',4'''-biacetoacetanilide | Yellow |
| 70 | " | 3-methyl-1-(2-chlorophenyl)-5-hydroxy-pyrazole | Reddish-Yellow |
| 71 | 3-bromo-5-aminomethylaniline | 3-hydroxy-2-naphth-para-anisidide (Naphtol AS-RL) | Red |
| 72 | " | 4'-chloro-3-hydroxy-2',5'-dimethoxy-2-naphthanilide (Naphtol AS-LC) | Bluish-Red |
| 73 | " | 3-hydroxy-N-2-naphthyl-2-naphthamide (Naphtol AS-SW) | Bluish-Red |
| 74 | " | 3'-chloro-3-hydroxy-2-naphth-ortho-anisidide (Naphtol AS-NEL) | Red |
| 75 | " | 3-methyl-1-(3-bromo- | Reddish- |

-continued

| Example No. | Diazotized Amine | Coupling Component | Shade |
|---|---|---|---|
|  |  | phenyl)-5-hydroxy-pyrazole | Yellow |
| 76 | 5-isopropyl-2-methyl-3-amino-methylaniline | 4'-chloro-3-hydroxy-2-naphtho-ortho-toluidide (Naphtol AS-TR) | Red |
| 77 | " | 2',2'''-diiodo-4',4'''-biacetoacet-anilide | Reddish-Yellow |
| 78 | " | 3-methyl-1-(p-tolyl)-5-hydroxypyrazole | Reddish-Yellow |
| 79 | " | 4,4'-bi-ortho-aceto-acetotoluidide (Naphtol AS-G) | Yellow |
| 80 | 5-ethyl-2-methyl-3-aminomethylaniline | 3-hydroxy-2-naphtho-2,4-xylidide (Naphtol AS-MX) | Red |
| 81 | " | 3'-chloro-3-hydroxy-2-naphth-ortho-anisidide | Red |
| 82 | " | 2',2'''-dibromo-4',4'''-biacetoacetanilide | Yellow |
| 83 | " | 3',3'''-diethoxy-4',4'''-biacetoacet-anilide | Yellow |
| 84 | " | 3-methyl-1-(4-iodo-phenyl)-5-hydroxy-pyrazole | Orange |
| 85 | 3,4-diethyl-5-amino-methylaniline | 3-methyl-1-(p-tolyl)-5-hydroxypyrazole | Reddish-Yellow |
| 86 | " | 3'-chloro-3-hydroxy-2-naphth-ortho-anis-idide (Naphtol AS-NEL) | Red |
| 87 | " | 2',2'''-dichloro-4',4'''-biacetoacet-anilide | Greenish-Yellow |
| 88 | " | 3-hydroxy-2',5'-dimethoxy-2-naphth-anilide (Naphtol AS-BG) | Bluish-Red |
| 89 | 3-methoxy-4-methyl-5-aminomethylaniline | 3-hydroxy-2-naphth-anilide (Naphtol AS) | Red |
| 90 | " | 7-bromo-3-hydroxy-2-naphth-ortho-anisidide | Red |
| 91 | " | 2',2'''-diiodo-4',4'''-biacetoacet-anilide | Reddish-Yellow |
| 92 | " | 3-methyl-1-(p-tolyl)-5-hydroxypyrazole | Reddish-Yellow |
| 93 | 3-chloro-4-iso-propyl-5-amino-methylaniline | 3-hydroxy-3'-nitro-2-naphthanilide (Naphtol AS-BS) | Bluish-Red |
| 94 | " | 5'-chloro-3-hydroxy-2',4'-dimethoxy-2-naphthanilide (Naphtol AS-ITR) | Bluish-Red |
| 95 | " | 7-bromo-3-hydroxy-2-naphth-ortho-anisidide | Red |
| 96 | " | 2',2'''-dibromo-4',4'''-biacetoacet-anilide | Yellow |
| 97 | " | 3-methyl-1-(o-tolyl)-5-hydroxypyrazole | Reddish-Yellow |
| 98 | 2,3,4-trimethyl-5-aminomethylaniline | 3-hydroxy-2-naphtho-ortho-toluidide (Naphtol AS-D) | Red |
| 99 | " | 3'-chloro-3-hydroxy-2-naphth-ortho-anis-idide (Naphtol AS-NEL) | Red |
| 100 | " | 4,4'-di-ortho-aceto-acetotoluidide (Naphtol AS-G) | Yellow |
| 101 | " | 3-methyl-1-(p-tolyl)-5-hydroxypyrazole | Reddish-Yellow |
| 102 | " | 4',4'''-biacetoacet-anilide | Yellow |
| 103 | 2-chloro-4,5-di-methoxy-3-amino-methylaniline | 3-hydroxy-2-naphth-para-anisidide (Naphtol AS-RL) | Red |

-continued

| Example No. | Diazotized Amine | Coupling Component | Shade |
|---|---|---|---|
| 104 | " | 7-bromo-3-hydroxy-2-naphth-ortho-anisidide | Bluish-Red |
| 105 | " | 3'-chloro-3-hydroxy-2-naphth-ortho-anisidide (Naphtol AS-NEL) | Red |
| 106 | " | 3-methyl-1-(4-chlorophenyl)-5-hydroxypyrazole | Reddish-Yellow |
| 107 | 5-chloro-2,4-diethoxy-3-aminomethylaniline | 3-hydroxy-2'-methyl-2-naphth-para-anisidide (Naphtol AS-LT) | Red |
| 108 | " | 2',2'''-dichloro-4',4'''-biacetoacetanilide | Yellow |
| 109 | " | 3',3'''-diethoxy-4',4'''-biacetoacetanilide | Yellow |
| 110 | " | 3-methyl-1-(p-tolyl)-5-hydroxypyrazole | Reddish-Yellow |
| 111 | 4,5-dimethoxy-2-fluoro-3-aminomethylaniline | 3-hydroxy-2-naphtho-ortho-phenetidide (Naphtol AS-PH) | Red |
| 112 | " | 3-hydroxy-2-naphthanilide (Naphtol AS) | Red |
| 113 | " | 2',2'''-dibromo-4',4'''-biacetoacetanilide | Reddish-Yellow |
| 114 | " | 3'-chloro-3-hydroxy-2-naphth-ortho-anisidide (Naphtol AS-NEL) | Red |
| 115 | " | 3-methyl-1-(2-ethoxy-5-nitrophenyl)-5-hydroxypyrazole | Reddish-Yellow |
| 116 | 2-chloro-4-methoxy-5-methyl-3-aminomethylaniline | 3-hydroxy-2-naphthanilide (Naphtol AS) | Red |
| 117 | " | 3-hydroxy-2-naphtho-ortho-phenetidide (Naphtol AS-PH) | Red |
| 118 | " | 3-methyl-1-(p-tolyl)-5-hydroxypyrazole | Reddish-Yellow |
| 119 | " | 5'-chloro-3-hydroxy-2',4'-dimethoxy-2-naphthanilide (Naphtol AS-ITR) | Red |
| 120 | " | 4',4'''-biacetoacetanilide | Yellow |
| 121 | 2,5-dichloro-4-methoxy-3-aminomethylaniline | 7-bromo-3-hydroxy-2-naphth-ortho-anisidide | Red |
| 122 | " | 3',3'''-diethoxy-4',4'''-biacetoacetanilide | Yellow |
| 123 | " | 4,4'-bi-ortho-acetoacetotoluidide (Naphtol AS-G) | Reddish-Yellow |
| 124 | " | 3'-chloro-3-hydroxy-2-naphth-ortho-anisidide (Naphtol AS-NEL) | Red |
| 125 | " | 3-methyl-1-(2,4-dichlorophenyl)-5-hydroxypyrazole | Yellow |
| 126 | 5-chloro-2-propyl-3-aminomethylaniline | 4'-chloro-3-hydroxy-2',5'-dimethoxy-2-naphthanilide (Naphtol AS-LC) | Bluish-Red |
| 127 | " | 3-methyl-1-(p-tolyl)-5-hydroxypyrazole | Reddish-Yellow |
| 128 | " | 2',2'''-dichloro-4',4'''-biacetoacetanilide | Yellow |
| 129 | " | 3-hydroxy-2-naphth-ortho-anisidide (Naphtol AS-OL) | Red |
| 130 | 3,5-bis(aminomethyl)aniline | 3-methyl-1-(p-tolyl)-5-hydroxypyrazole | Reddish-Yellow |
| 131 | " | 3-hydroxy-2',5'-dimethoxy-2-naphthanilide (Naphtol | Red |

| Example No. | Diazotized Amine | Coupling Component | Shade |
|---|---|---|---|
| | | AS-BG) | |
| 132 | " | 3'-chloro-3-hydroxy-2-naphth-ortho-anisidide (Naphtol AS-NEL) | Scarlet |
| 133 | " | 2',2'''-diiodo-4',4'''-biacetoacetanilide | Yellow |
| 134 | 2,4-diethyl-3,5-bis-(aminoethyl)aniline | 3'-chloro-3-hydroxy-2-naphth-ortho-anisidide (Naphtol AS-NEL) | Scarlet |
| 135 | " | 5'-chloro-3-hydroxy-2',4'-dimethoxy-2-naphthanilide (Naphtol AS-ITR) | Red |
| 136 | " | 3-hydroxy-3'-nitro-2-naphthanilide (Naphtol AS-BS) | Red |
| 137 | " | 3'-chloro-3-hydroxy-2-naphtho-ortho-toluidide (Naphtol AS-KB) | Scarlet |
| 138 | " | 4',4'''-biacetoacetanilide | Greenish-Yellow |
| 139 | " | 3-methyl-1-(2,4-dinitrophenyl)-5-hydroxypyrazole | Orange |
| 140 | 2-iodo-3,5-bis-(aminomethyl)-aniline | 3-methyl-1-(p-tolyl)-5-hydroxypyrazole | Reddish-Yellow |
| 141 | " | 3',3'''-diethoxy-4',4'''-biacetoacetanilide | Yellow |
| 142 | " | 4,4'-bi-ortho-acetoacetotoluidide (Naphtol AS-G) | Greenish-Yellow |
| 143 | " | 4'-chloro-3-hydroxy-2',5'-dimethoxy-2-naphthanilide (Naphtol AS-LC) | Bluish-Red |
| 144 | 4-fluoro-3,5-bis-(aminomethyl)aniline | 2',2'''-dichloro-4',4'''-biacetoacetanilide | Greenish-Yellow |
| 145 | " | 3-hydroxy-2-naphtho-2,4-xylidide (Naphtol AS-MX) | Scarlet |
| 146 | " | 3-hydroxy-2-naphth-ortho-anisidide (Naphtol AS-OL) | Red |
| 147 | " | 5'-chloro-3-hydroxy-2',4'-dimethoxy-2-naphthanilide (Naphtol AS-ITR) | Red |
| 148 | " | 3-methyl-1-(2-methyl-4-iodophenyl)-5-hydroxypyrazole | Reddish-Yellow |
| 149 | 2-methoxy-4-methyl-3,5-bis(aminomethyl)aniline | 4'-chloro-3-hydroxy-2-naphtho-ortho-toluidide (Naphtol AS-TR) | Scarlet |
| 150 | " | 3-hydroxy-N-2-naphthyl-2-naphthamide (Naphtol AS-SW) | Red |
| 151 | " | 2',2'''-dibromo-4',4'''-biacetoacetanilide | Yellow |
| 152 | " | 3-hydroxy-2-naphtho-ortho-phenetidide (Naphtol AS-PH) | Scarlet |
| 153 | " | 3-methyl-1-(2,5-dimethylphenyl)-5-hydroxypyrazole | Reddish-Yellow |
| 154 | 2,4-diisopropyl-3,5-bis(aminomethyl)aniline | 3'-chloro-3-hydroxy-2-naphth-ortho-anisidide (Naphtol AS-NEL) | Scarlet |
| 155 | " | 4'-chloro-3-hydroxy-2',5'-dimethoxy-2-naphthanilide (Naphtol AS-LC) | Red |
| 156 | " | 3-hydroxy-2-naphth-para-anisidide (Naphtol AS-RL) | Scarlet |
| 157 | " | 3-methyl-1-(p-tolyl)- | Reddish- |

-continued

| Example No. | Diazotized Amine | Coupling Component | Shade |
|---|---|---|---|
| 158 | " | 5-hydroxypyrazole 4',4'''-biacetoacet-anilide | Yellow Greenish-Yellow |
| 159 | 4-bromo-2-methoxy-3,5-bis(aminomethyl)aniline | 7-bromo-3-hydroxy-2-naphth-ortho-anisidide | Red |
| 160 | " | 3-hydroxy-2-naphthanilide (Naphtol AS) | Scarlet |
| 161 | " | 2',2'''-diiodo-4',4'''-biacetoacet-anilide | Yellow |
| 162 | " | 3'-chloro-3-hydroxy-2-naphth-ortho-anisidide (Naphtol AS-NEL) | Red |
| 163 | " | 3-methyl-1-(2,4,6-trichlorophenyl)-5-hydroxypyrazole | Yellow |

EXAMPLE 164

Following the procedure described in Example 1 above, 4.3 parts of 4-aminomethylaniline dihydrochloride in a solution of 100 parts of water and 2.4 parts of concentrated hydrochloric acid were diazotized with 1.5 parts of sodium nitrite dissolved in 12 parts of water at 0°-5° C. In a separate container, 5.9 parts of 3-hydroxy-2-naphth-o-anisidide (Naphtol AS-OL) was mixed with 38 parts of hot water, 18.6 parts of ethoxyethanol, 2 drops of nonylphenoxypoly(ethyleneoxy)ethanol (Igepal ® CO-630) and 3.1 parts of 50 percent aqueous sodium hydroxide. To the solution thus obtained, there was added in a thin stream the cold diazonium solution prepared as described above. The reaction mixture was stirred at ambient temperature until the consumption of the diazonium salt was complete. The slurry was made slightly alkaline to Brilliant Yellow test paper and the red product which separated was collected by filtration, washed with 200 parts of a one percent aqueous sodium chloride solution and dried in a vacuum oven to obtain a red dyestuff having the formula

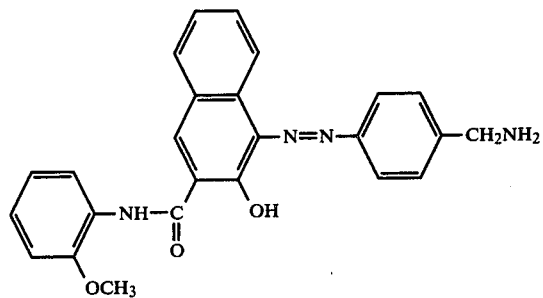

The visible absorption spectrum of a solution consisting of 0.02 g of the dyestuff dissolved in 200 ml of dimethylformamide diluted to one liter with an aqueous solution of one percent Igepal ® CO-630 and containing 3 drops of glacial acetic acid showed a maximum at 500 millimicrons, A=0.8656.

A concentrated dye solution was prepared by dissolving one part of the dyestuff in 200 ml of dimethylformamide and 3 drops of glacial acetic acid and then diluting this solution to a total volume of one liter with water. Paper dyed with this solution had a yellow-scarlet shade and was found to be highly bleachable. The dye was found to bleed only slightly in the water-bleed test.

EXAMPLE 165

Following the procedure described in Example 1 above, 4.3 parts of 3-aminomethylaniline dihydrochloride in a solution of 100 parts of water and 2.4 parts of concentrated hydrochloric acid were diazotized with 1.5 parts of sodium nitrite at 0° to 5° C. In a separate container 5.9 parts of 3-hydroxy-2-naphth-o-anisidide (Naphtol AS-OL) were dissolved in a solution of 38 parts hot water, 18.6 parts of ethoxyethanol, 2 drops of nonylphenoxypoly(ethyleneoxy)ethanal (Igepal ® CO-630) and 3.1 parts of 50 percent aqueous sodium hydroxide. To the resulting solution there was then added in a thin stream the cold diazonium solution prepared as described above. The reaction mixture was stirred at room temperature until the consumption of the diazonium salt was complete. The resulting solution was made slightly alkaline to Brilliant Yellow test paper by the addition of approximately 2.3 parts of concentrated aqueous ammonia and the solid which separated was collected by filtration, washed with 200 parts of one percent aqueous sodium chloride solution and dried in a vacuum oven to obtain a red dyestuff having the formula

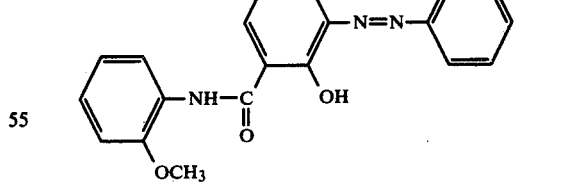

The visible absorption spectrum of an aqueous acetic acid solution of this dyestuff, containing 0.02 g of the dye per liter of solution showed a maximum at 498 millimicrons, A=0.756.

A dye solution was prepared by dissolving 1.0 g of this dyestuff in 200 ml of dimethylformamide and 3 drops of glacial acetic acid and then diluting the solution to a volume of one liter with water. Paper dyed with this solution had a yellow-scarlet shade and was found to be highly bleachable. The dye was found to bleed only slightly in the water-bleed test.

EXAMPLE 166

Following the procedure described in Example 1 above, 2.72 parts of 4-(2-aminoethyl)aniline in a mixture of 100 parts of water, 7.14 parts of concentrated hydrochloric acid and 80 parts of crushed ice were diazotized at 0°–5° C. with 1.5 parts of sodium nitrite dissolved in 12 parts of water. In a separate container 5.9 parts of 3-hydroxy-2-naphth-o-anisidide (Naphtol AS-OL) were mixed with 18.6 parts of 2-ethoxyethanol, 38 parts of hot water and 3.1 parts of 50 percent aqueous sodium hydroxide. To the resulting solution was then added in a thin stream the cold diazonium solution prepared as described above. The reaction mixture was stirred at ambient temperature until no diazonium salt remained. The resulting solution was made slightly alkaline to Brilliant Yellow paper by the addition of aqueous ammonia and the solid product which resulted was collected by filtration and dried in a vacuum oven. There was thus obtained a red dyestuff having the formula

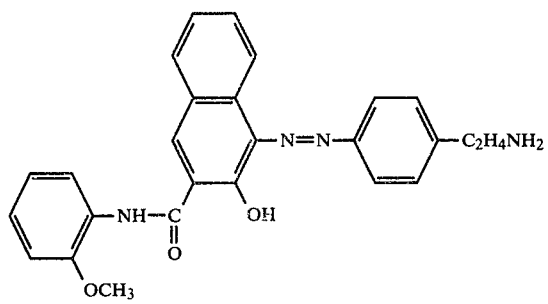

The visible absorption spectrum of an aqueous acetic acid solution of this dyestuff, containing 0.02 g of the dye per liter of solution showed a maximum at 504 millimicrons, A=0.8176.

A dye solution was prepared by thoroughly mixing one part of this dyestuff with five parts of 10 percent acetic acid and diluting the resultant paste of the acetic acid addition salt to a volume of one liter with water. Paper dyed with this solution had a yellow-scarlet shade and was found to be highly bleachable. The dye was found to bleed only slightly in the water-bleed and in the soap-bleed test.

The following table lists further Examples of additional azo dyestuffs of this invention prepared by diazotizing the amines shown in the second column of the table and coupling the resulting diazo compounds with the coupling components shown in the third column of the table following procedures similar to those described in Examples 1–5 above. The indicated shades are obtained when aqueous solutions of the acid-addition salt forms of the dyestuffs are used for dyeing cellulose.

| Ex. No. | Diazotized Amine | Coupling Component | Shade |
| --- | --- | --- | --- |
| 167 | 3-methoxy-4-amino-methylaniline | 3-hydroxy-2-naphth-ortho-anisidide (Naphtol AS-OL) | Red |
| 168 | " | 2',2'''-dichloro-4',4'''-biacetoacet-anilide | Yellow |
| 169 | " | 3-methyl-1-(p-tolyl)-5-hydroxypyrazole | Reddish-Yellow |
| 170 | " | 4'-chloro-3-hydroxy-2',5'-dimethoxy-2-naphthanilide (Naphtol AS-LC) | Red |
| 171 | 4-(2-aminoethyl)-aniline | 2',2'''-dichloro-4',4'''-biacetoacet-anilide | Greenish-Yellow |
| 172 | " | 3-methyl-1-(p-tolyl)-5-hydroxypyrazole | Yellow |
| 173 | " | 4'-chloro-3-hydroxy-2',5'-dimethoxy-2-naphthanilide (Naphtol AS-LC) | Scarlet |
| 174 | " | 4',4'''-biacetoacet-anilide | Greenish-Yellow |
| 175 | 3-bromo-4-amino-methylaniline | 4,4'-bi-ortho-aceto-acetotoluidide (Naphtol AS-G) | Greenish-Yellow |
| 176 | " | 5'-chloro-3-hydroxy-2',4'-dimethoxy-2-naphthanilide (Naphtol AS-ITR) | Red |
| 177 | " | 3-methyl-1-(p-tolyl)-5-hydroxypyrazole | Yellow |
| 178 | " | 3'-chloro-3-hydroxy-2-naphth-ortho-anisidide (Naphtol AS-NEL) | Scarlet |
| 179 | 4-aminomethyl-aniline | 3-hydroxy-2-napho-ortho-toluidide (Naphtol AS-D) | Scarlet |
| 180 | " | 4,4'-bi-ortho-aceto-acetotoluidide (Naphtol AS-G) | Greenish-Yellow |
| 181 | " | 3,3'''-diethoxy-4',4'''-biacetoacet-anilide | Yellow |
| 182 | " | 3-methyl-1-(p-tolyl)-5-hydroxypyrazole | Yellow |
| 183 | 3-chloro-4-amino-methylaniline | 4'-chloro-3-hydroxy-2-naphtho-ortho-toluidide (Naphtol AS-TR) | Scarlet |
| 184 | " | 2',2'''-diodo-4',4'''-biacetoacetanilide | Yellow |
| 185 | " | 3-methyl-1-(p-tolyl)-5-hydroxypyrazole | Yellow |
| 186 | " | 4,4'-bi-ortho-aceto-acetotoluidide (Naphtol AS-G) | Yellow |
| 187 | 3-ethoxy-4-amino-methylaniline | 3-hydroxy-2-naphtho-2,4-xylidide (Naphtol AS-MX) | Red |
| 188 | " | 3'-chloro-3-hydroxy-2-naphth-ortho-anisidide | Red |
| 189 | " | 2',2'''-dibromo-4',4'''-biacetoacet-anilide | Yellow |
| 190 | " | 3',3'''-diethoxy-4',4'''-biacetoacet-anilide | Yellow |

What is claimed is:

1. A compound of the formula

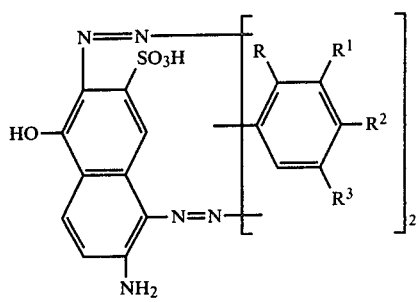
wherein:
R is hydrogen, lower-alkyl, lower-alkoxy or halogen;
$R^2$ is hydrogen, lower-alkyl, lower-alkoxy or halogen; and
$R^1$ and $R^3$ are aminomethyl.
2. A compound according to claim 1 wherein R is lower-alkoxy.
3. A compound according to claim 2 wherein $R^2$ is hydrogen.
4. The compound according to claim 3 wherein R is methoxy.
* * * * *